US008502694B2

(12) United States Patent
Foley et al.

(10) Patent No.: US 8,502,694 B2
(45) Date of Patent: Aug. 6, 2013

(54) COMMUNICATION DEVICES AND METHODS FOR DEVICES INCLUDING GENERIC INDICATORS CONFIGURABLE FOR REAL-TIME ANNOUNCEMENT OF RECEIVED COMMUNICATION SIGNALS

(75) Inventors: Sheila A. Foley, Chicago, IL (US); Yoo Jung Ahn, Chicago, IL (US); Erik G. Almenberg, Chicago, IL (US); Ryan A. Powell, Seattle, WA (US)

(73) Assignee: Motorola Mobility LLC, Libertyville, IL (US)

( * ) Notice: Subject to any disclaimer, the term of this patent is extended or adjusted under 35 U.S.C. 154(b) by 661 days.

(21) Appl. No.: 12/609,738

(22) Filed: Oct. 30, 2009

(65) Prior Publication Data

US 2011/0102175 A1    May 5, 2011

(51) Int. Cl.
*G08B 5/00*    (2006.01)

(52) U.S. Cl.
USPC ............... 340/815.4; 340/539.1; 340/539.11; 340/691.1; 340/693.5

(58) Field of Classification Search
USPC ............... 340/539.1, 539.11, 815.4, 815.43, 340/815.45, 815.46, 691.1, 693.5; 455/157.2, 455/159.1, 566, 575.1
See application file for complete search history.

(56) References Cited

U.S. PATENT DOCUMENTS

| 2006/0148425 A1* | 7/2006 | Carlson .................. 455/90.3 |
| 2008/0129531 A1 | 6/2008 | Messel et al. |
| 2008/0204268 A1* | 8/2008 | Dowling et al. ......... 340/815.45 |
| 2008/0267632 A1* | 10/2008 | Neumann .................. 398/115 |

FOREIGN PATENT DOCUMENTS

| EP | 1528782 A2 | 5/2005 |
| EP | 1768353 A2 | 3/2007 |
| GB | 2377125 A | 12/2002 |

OTHER PUBLICATIONS

Patent Cooperation Treaty, International Search Report and Written Opinion of the International Searching Authority for International Application No. PCT/US2010/052138, Jan. 4, 2011, 11 pages.

* cited by examiner

*Primary Examiner* — Hung T. Nguyen
(74) *Attorney, Agent, or Firm* — Gary J. Cunningham

(57) ABSTRACT

Disclosed are communication devices and methods of communication devices including generic indicators and a user interface to configure the generic indicators so that a user can privately determine, in real-time, from whom a communication signal has been received and the type of communication signal received. A user may select contacts having communication addresses stored in a memory, particular types of communication signals and correlate them to generic indicators. When communication signals are received by the device that correspond to a selected communication address and a particular type of communication signal an announcement can be made by configured generic indicators. Once configured, when the device is in an indicator state, a device's ringer and/or vibrator may be disabled, particularly where such disturbances are unacceptable and a user nevertheless may be able to determine, according to the configured generic indicators from which contact a particular type of communication has been received.

17 Claims, 2 Drawing Sheets

COMMUNICATION DEVICES AND METHODS FOR DEVICES INCLUDING GENERIC INDICATORS CONFIGURABLE FOR REAL-TIME ANNOUNCEMENT OF RECEIVED COMMUNICATION SIGNALS

FIELD

Disclosed are communication devices and methods of communication devices including generic indicators and a user interface to configure the generic indicators, and in particular, configurable for announcement in real-time from whom a communication signal has been received and the type of communication signal received.

BACKGROUND

Billions of people are mobile communication devices owners/users. Users from all walks of life own mobile communication devices. Mobile communication devices are used for many different purposes including but not limited to voice communications, text messaging, Internet browsing, commerce such as banking, and social networking. The circumstances under which users of mobile communication device use their devices varies widely as well. Personalization of communication devices is therefore desirable.

Mobile communication devices include memory that can store contact information and communication addresses. When a call comes in, the device will typically announce the incoming communication signal by a ring or vibration. If a user wishes to know from whom a communication signal was received, the user must wake up a screen and/or dig through user interface menus in order to find this information. The source of the call is then typically visually displayed on the main display of the device, if such information is stored in the memory. Otherwise, if the caller is not recognized, the source's communication address can be displayed as provided by the cellular service provider. Accordingly, privacy in the receipt of a communication signal and in the determination of the source of the communication signal is not typically available to a user when the device is a state in which to receive communication signals.

DETAILED DESCRIPTION

Figure 1:
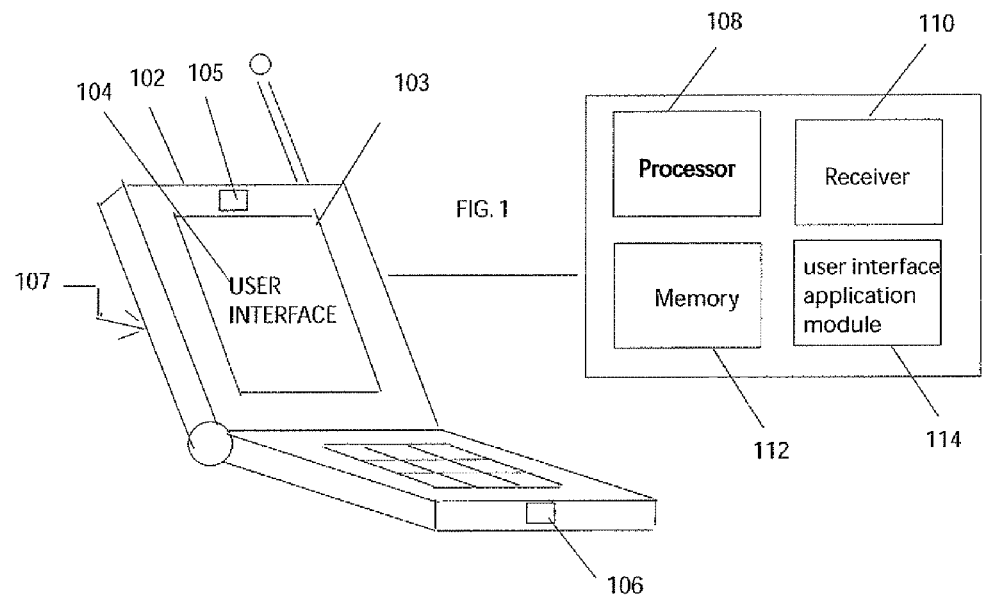
FIG. 1 depicts an embodiment of a communication device.

Typically a mobile communication device user will have a certain number of contacts with whom the user has frequent contact stored in the memory of the device. For example, were a user a mother and wife, the user may have frequent contact with her children, husband, and others such as friends, parents and colleagues. Another example may be a teenager, who is frequent contact with parents, friends and siblings. There may be times when a user cannot accept a call even from those with whom the user is in frequent contact. That is, there may be times when the ringer and/or the vibrator cannot be on. For example, a user may be in a meeting or may be in a classroom where such disturbances are unacceptable. However, the user may wish to know when such a call or other type of communication is received from particular contacts.

Disclosed are devices and methods of devices including generic indicators and a user interface to configure the generic indicators so that a user can privately determine, in real-time, from whom a communication signal has been received and the type of communication signal received. A user may select contacts having communication addresses stored in a memory, particular types of communication signals and correlate them to generic indicators. When communication signals are received by the device that correspond to a selected communication address and a particular type of communication signal, such as email, SMS, text messaging, voice communication, voice mail or social networking indications, an announcement can be made by configured generic indicators. In this way, a device's ringer and/or vibrator may be disabled and a user nevertheless may be able to determine in real-time, according to the configured generic indicators from which contact a particular type of communication has been received.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

FIG. 1 depicts an embodiment of a communication device 102. The communication device 102 may be implemented as a cellular telephone (also called a mobile phone) or any other type of electronic communication device. The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP). Wired devices such as landlines and desktop computers are also communication devices within the scope of this discussion. It is understood that any communication device is within the scope of this discussion.

The depicted communication device 102 is an embodiment of a clam shell form factor device in an open position, the device having at least one display screen 103 that can provide a visual user interface 104. A speaker 105 can provide an audio driven user interface and a microphone 106 can provide audio input for a user interface. A user interface 104 can be provided so a user can determine how the generic indicators will provide an announcement upon receipt of a communication signal corresponding to a communication address stored in a memory and of a particular type of communication signal. It is understood that a user interface can be of any type, including a combination of visual and audio user interface output and input.

As discussed above, the communication device 102 can be of any type. In the embodiment of FIG. 1, the clam shell form factor back side of the display housing 107 can include generic indicators (see FIG. 2) that can be activated, for example, when the clam shell form factor is in a closed position. Depending upon the form factor of the device 102, the generic indicators may be in any suitable location and form. For example, a candy bar form factor mobile communication device may utilize its display screen to create a set of generic indicators, perhaps by displaying a matrix or a spiral pattern.

The user interface 104 can be used to conform the generic indicators to convey information in a manner that is meaningful to the user. In this way, the device 102 can be in an indicator state where the ringer and/or the vibrator is disabled and the user privately can know from which contact they received a communication signal and the type of signal. Depending upon the structure of the generic indicators, they can provide announcements by any suitable manner such as at least one of one or more colors, particular timing characteristics, illumination density, numeric indicators, alpha indicators, icon indicators, indicia, images or patterns. As depicted in the embodiment of FIG. 2, it may be that the generic indicators are distinct from a main display as less power may be consumed to activate such generic indicators.

The communication device 102 can include at least one processor 108, at least one receiver or transceiver 110, a memory 112 to store contacts, for example in a directory, and a user interface application module 114. The modules can carry out certain processes of the methods as described herein. Steps of methods may involve modules and modules may be inferred by the methods discussed herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

A user interface application module 114 can be in communication with the processor 108 to provide a user interface 104 determine identified communication signals corresponding to a communication address stored in a memory 112 and to determine which of the generic indicators is to provide an announcement upon receipt by a receiver 110 of a communication signal corresponding an identified communication signal. Moreover, the user interface module 114 can allow a user to determine how to indicate that the communication signal is a particular type of communication signal. Different types of communication signals can include, for example, at least one of email, SMS, text messaging, voice communication, voice mail or social networking indications. In an indicator state where the ringer/vibrator functions are disabled a user can view the conformed generic indicators to determine the identity of the contact and the type of communication received.

Figure 2:
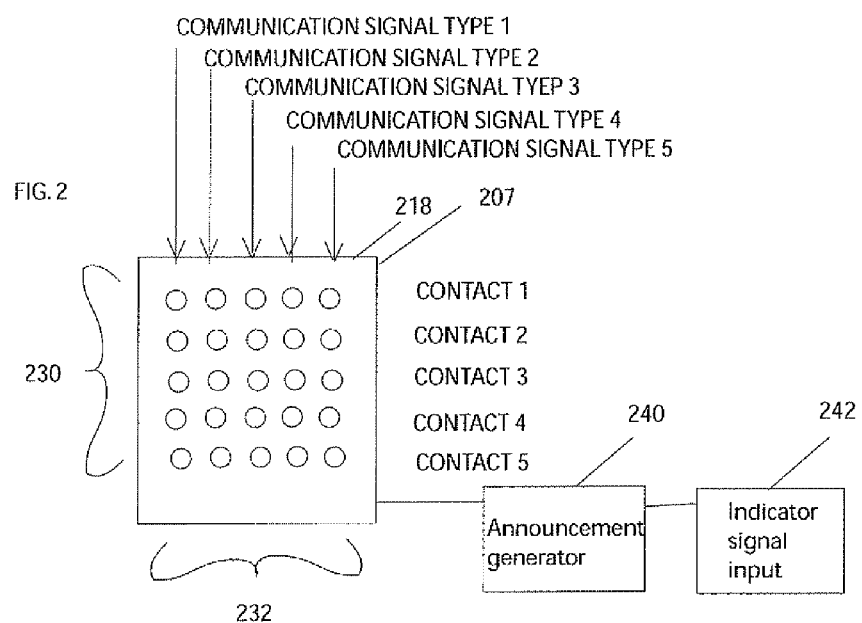
FIG. 2 depicts the backside of an embodiment of a clamshell form factor communication device housing including an arrangement of generic indicators.

FIG. 2 depicts the backside 207 of an embodiment of a clamshell form factor communication device 102 (see FIG. 1) housing 218 including an arrangement of generic indicators. In this example, the generic indicators are configured to be visible by way of the exterior of the housing 218. In this embodiment, the generic indicator can represent five contacts 230 in the vertical direction, and five communication signals 232 in the horizontal direction. An announcement generator 240 is configured to generate an announcement by one or more of the generic indicators based on indicator signal input 242. When in an indicator state and an indicator signal is received, an announcement generator 230 can generate an announcement. For example, the generic indicators may include at least one of LEDs, EINk, LCDs, Els or OLEDs.

Figure 3:
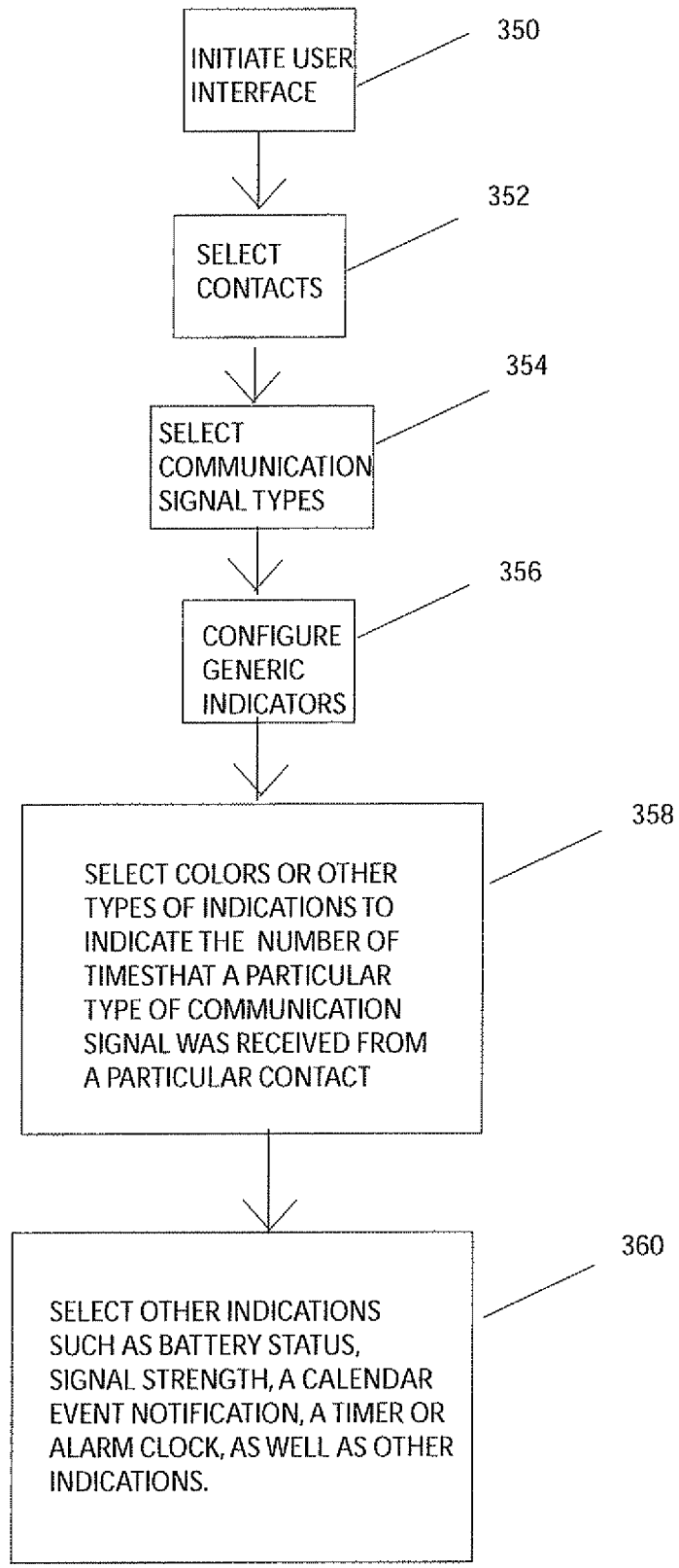
FIG. 3 depicts an embodiment of a flow chart of a user interface to determine which of the generic indicators to provide an announcement upon receipt of a communication signal of a particular type of communication signal from a particular contact.

FIG. 3 depicts an embodiment of a flow chart of a user interface 104 (see FIG. 1) to determine which of the generic indicators 230 and 232 (see FIG. 2) to provide an announcement upon receipt of a communication signal of a particular type of communication signal (see FIG. 2 Communication Signal Types 1-5) from a particular contact (Contacts 1-5). Providing a user the ability to conform the generic indicators so that the user is able to discern, for example, from which contact (Contacts 1-5) a communication was received, what type and possibly how many times that type of communication signal was received, can allow a user to personalize the user's device 102 and provide privacy. Moreover, the device can provide information about incoming communication even when the ringer and/or vibrator is disabled.

Depending upon the configuration of the generic indicators, labels may or may not be used to indicate incoming communication signal activity. In any event, a label or any other indicia may be personalized so that its meaning is not apparent to anyone other than the user, thus privacy may be preserved. It is understood that the user interface 104 and the generic indicators 230 and 232 can be of any suitable order or configuration including audible output so as to determine receipt of a communication signal corresponding to a communication address stored in a memory and to generate an indicator signal to at least one of the generic indicators based on the communication address and a determination of which of different types of communication signal is received.

Upon initiating 350 the user interface 104 (see FIG. 1), contacts from a directory stored in a memory 112 can be selected 352. It is understood that the contacts may be input at any time and that contacts may be designated from any source. Moreover, it is understood that certain default settings may be available as well. The user can select 354 communication signal types for which to provide an indication. As mentioned above, different types of communication signals received includes at least one of email, SMS, text messaging, voice communication, voice mail or social networking indications. The generic indicator may then be configured 356.

Other types of indications may be provided based upon the configuration of the generic indicators. For example, a user may select 358 colors or other types of indications to indicate the number of time that a particular type of communication signal was received from a particular contact. For example, a contact may have left a voice mail ten times, and that number may be indicated by at least one of one or more colors, particular timing characteristics, illumination density, numeric indicators, alpha indicators, icon indicators, indicia, images or patterns.

The generic indicators user interface 104 may further allow a selection 360 of other indication such as battery status, signal strength, a calendar event notification, a timer or alarm clock as well as any other indications. Once configured, when the device 102 is in an indicator state, a device's ringer and/or vibrator may be disabled, particularly where such disturbances are unacceptable and a user nevertheless may be able to determine, according to the configured generic indicators for which contact a particular type of communication has been received.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A communication device, comprising:
a housing having an exterior surface including generic indicators and a main display distinct from the generic indicators, each configured to be visible by way of the exterior surface of the housing;
the generic indicators include a plurality of indicators arranged in a vertical direction with each vertical indicator being associated to a particular contact and a plurality of indicators arranged in a horizontal direction with each horizontal indicator being associated with a particular communication signal;
a processor in communication with the generic indicators;
a receiver in communication with the processor, the receiver being configured to receive communication signals of different types, the processor configured to determine receipt of a communication signal corresponding to a communication address stored in a memory and to generate an indicator signal to at least one of the generic indicators based on the communication address and a determination of which of different types of communication signal is received; and
an announcement generator in communication with the processor is configured to generate an announcement by the at least one of the generic indicators based on the indicator signal.

2. The device of claim 1, further comprising:
a user interface to determine which of the generic indicators to provide an announcement upon receipt of a communication signal corresponding to a communication address stored in a memory and of a particular type of communication signal.

3. The device of claim 1, further comprising:
a user interface to determine how the generic indicators will provide an announcement upon receipt of a communication signal corresponding to a communication address stored in a memory and of a particular type of communication signal.

4. The device of claim 1 wherein different types of communication signals received includes at least one of email, SMS, text messaging, voice communication, voice mail or social networking indications.

5. The device of claim 1 wherein the generic indicators provide an announcement by at least one of one or more colors, particular timing characteristics, illumination density, numeric indicators, alpha indicators, icon indicators, indicia, images or patterns.

6. The device of claim 1 wherein the generic indicators are at least one of LEDs, EINk, LCDs, Els or OLEDs.

7. The device of claim 1 wherein the main display is located on a front side of the exterior surface and the generic indicators are located on a backside surface.

8. The device of claim 1 wherein the generic indicators are displayed on a display of the device.

9. The device of claim 1 wherein the generic indicators are displayed on a display of the device.

10. A communication device, comprising:
a housing having an exterior surface including generic indicators and a main display distinct from the generic indicators, each configured to be visible by way of the exterior surface of the housing;
the generic indicators include a plurality of indicators arranged in a vertical direction with each vertical indicator being associated to a particular contact and a plurality of indicators arranged in a horizontal direction with each horizontal indicator being associated with a particular communication signal;
a processor in communication with the generic indicators;
a memory including stored communication addresses; and
a user interface in communication with the processor to determine identified communication signals corresponding to a communication address stored in a memory and to determine which of the generic indicators is to provide an announcement upon receipt of a communication signal corresponding to an identified communication signal and how to indicate that the communication signal is a particular type of communication signal.

11. The device of claim 10 further comprising:
at least one receiver in communication with the processor, the receiver capable of receiving communication signals of different types of communication signals, the processor configured to determine an identified communication signal corresponding to a communication address stored in a memory and which type of communication has been received and to generate an indicator signal to the generic indicators to provide an announcement.

12. The device of claim 10 wherein different types of communication signals received includes at least one of email, SMS, text messaging, voice communication, voice mail, pushed messaging or social networking indications.

13. The device of claim 10 wherein the generic indicators provide an announcement by at least one of one or more colors, particular timing characteristics, numeric indicators, alpha indicators, icon indicators, indicia, images or patterns.

14. The device of claim 10 wherein the generic indicators of the set of generic indicators are at least one of LEDs, Elnks, LCDs, ELs or OLEDs.

15. A method of a communication device including at least one receiver and communication addresses in memory, the method comprising:
providing a wireless communication device including a housing having an exterior surface including generic indicators and a main display distinct from the generic indicators, each configured to be visible by way of the exterior surface of the housing, the generic indicators include a plurality of indicators arranged in a vertical direction with each vertical indicator being associated to a particular contact and a plurality of indicators arranged in a horizontal direction with each horizontal indicator being associated with a particular communication signal;

providing a user interface to determine one or more identified communication addresses corresponding to communication addresses in memory and how to generate an announcement by one or more generic indicators upon receipt by the device of a communication signal corresponding to an identified communication address and being of a particular type of communication signal;

generating an announcement by one or more of the generic indicators upon receipt of a communication signal corresponding to an identified communication address.

16. The device of claim 15 wherein receiving a communication signal of a particular type of communication signal includes receiving at least one of email, SMS, text messaging, voice communication, voice mail, pushed messaging or social networking indications.

17. The device of claim 15 wherein generating an announcement by one or more of the generic indicators includes annunciating at least one of one or more colors, particular timing characteristics, numeric indicators, alpha indicators, icon indicators, indicia, images or patterns.

* * * * *